Oct. 9, 1962 H. MEY 3,057,235
APPARATUS FOR MACHINING NON-CIRCULAR WORK
Filed Feb. 24, 1959 2 Sheets-Sheet 1

Inventor:
HELMUT MEY
by
Mestern & Kollin
ATTORNEYS

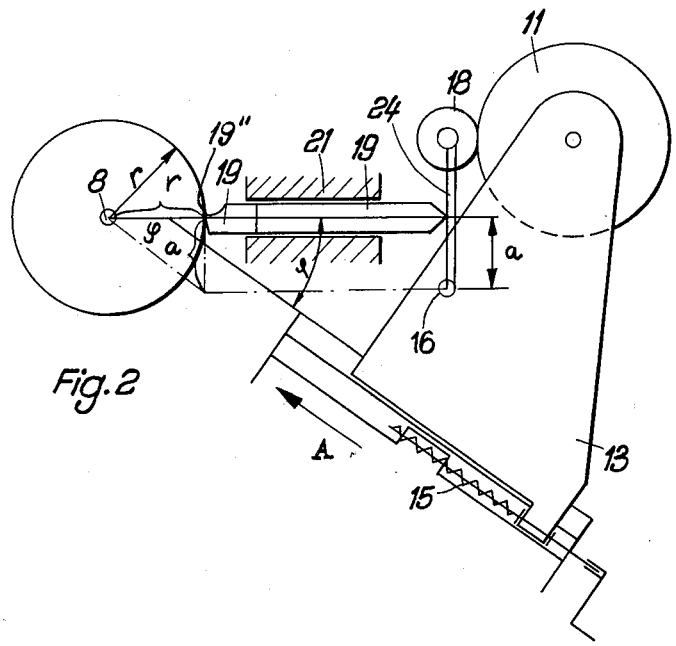
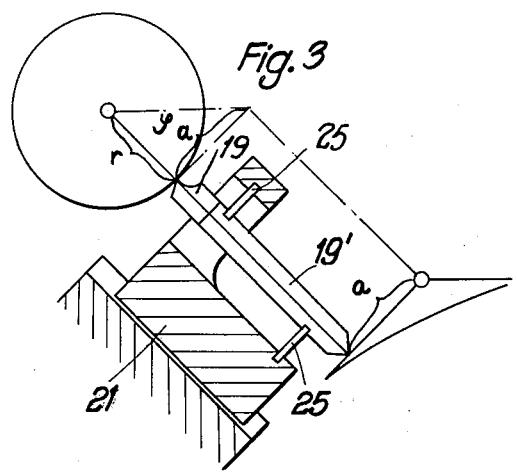

United States Patent Office 3,057,235
Patented Oct. 9, 1962

3,057,235
APPARATUS FOR MACHINING NON-CIRCULAR WORK
Helmut Mey, Opladen, Germany, assignor to Goetzewerke Friedrich Goetze A.-G., Burscheid, near Koln, Germany, a body corporate of Germany
Filed Feb. 24, 1959, Ser. No. 794,891
Claims priority, application Germany Mar. 22, 1958
7 Claims. (Cl. 82—19)

This invention relates to an apparatus for machining the peripheral surfaces of profiled work pieces, for example a number of piston rings assembled in the form of a package, having one or more cutting tools which are movably mounted and are adjustable to machine work of different diameters. The cutting tools are controlled by a feeler which bears against a template and is mounted, together with the template, one a slide which can be adjusted relative to the axis of the work.

In commonly owned U.S. Patent No. 2,932,227 there has been disclosed an apparatus of the above kind wherein the machine tool is mounted at one end of an angle lever whose free end is supported on the feeling lever which bears against the template and is also in the form of an angle lever. This support consists of a knife edge adjustably arranged on the angle lever which carries the machine tool. The angle lever carrying the machine tool, as well as the slide which carries the feeling lever and the template, is adjustable parallel to the plane which passes through the axis of the work and the cutting edge of the tool. The knife edge between the two angle levers is then adjusted in such a way that its distance from the pivot of the feeling lever is equal to the diameter of the work. In this way it is possible to turn piston rings of different diameters and similar geometrical shapes with the use of a single template. Further, by adjusting the slide which carries the template and the feeling lever relative to the angle lever which carries the machine tool, the transmission ratio between the template and the work can be altered.

It has now been found that the above advantageous result can also be obtained with a profile turning apparatus whose construction is considerably simpler than that of the machine described in the above patent and which can be attended to and adjusted more easily.

According to the present invention, the machine tool is guided so as to be radially displaceable relative to the axis of the work and the feeling lever which bears against the template acts directly on the machine tool, or on a carrier therefor, whereas the slide which carries the template and the feeling lever is adjustable at an angle to the axis along which the machine tool is displaced. Advantageously, the feeling lever is arranged relative to the machine tool in such a way that the angle between the plane which passes through the axis of the work and the cutting edge of the machine tool, on the one hand, and the arm of the feeling lever which bears directly on the machine tool or its carrier, on the other hand, is approximately 90°. In this way the construction of the apparatus becomes extremely simple, since only a single lever is necessary for the transmission of the control movement from the template to the machine tool. Further, the adjustment to different diameters of work can be effected simply by adjusting the slide which carries the template and the feeling lever because the machine tool, or its suitably guided carrier, is adjusted as it were automatically to the desired diameter of the work. Also, each time the machine is adjusted for work of different diameter the profile determined by the template is maintained, provided the construction is such that the pivot of the feeling lever intersects the axis of displacement of the machine tool when the cutting edge of the tool coincides with the axis of the work. This case does not, in fact, occur in practice; it does, however, give a basic principle for the construction of an apparatus of the invention if piston rings of different diameters having similar geometrical shapes are to be made with the apparatus.

Various constructional embodiments of profile turning apparatus in accordance with the invention are diagrammatically illustrated, by way of example, in the accompanying drawing in which:

FIGURE 2 is a similar view of a second embodiment working on a principle analogous to that of the embodiment in FIGURE 1; and FIGURE 3 represents an explanatory diagram.

Figure 1:
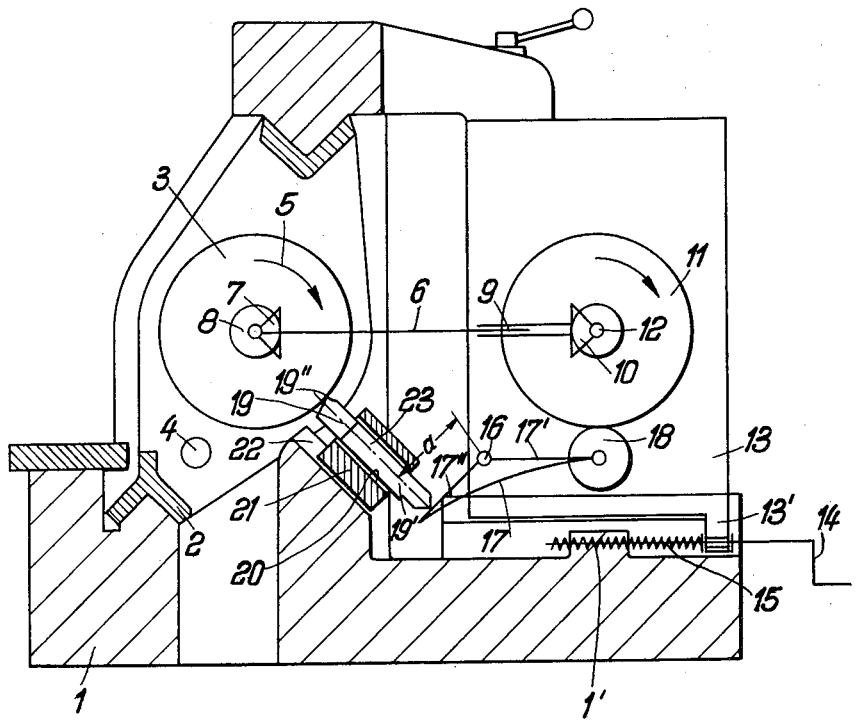
FIGURE 1 is a vertical section through the axis of the work in a first embodiment.

As shown in FIGURE 1 of the drawing, the work 3, which may consist of a number of piston rings which are assembled together in the form of a package, is mounted on a slide 2, the feed movement of which slide is effected by a spindle 4. The rotary movement in the direction of the arrow 5 which is necessary for machining the work 3 is effected by a drive shaft 6, shown diagrammatically which drives the shaft 8 of the work by means of bevel wheels 7. A shaft 12 carrying a copying template 11 is also driven from the shaft 6 through a displaceable coupling 9 and bevel wheels 10. The template 11 rotates with the same speed as the work 3. The template 11 with its shaft 12 is mounted in a displaceable slide 13, which can be adjusted by means of a threaded spindle 15 provided with a hand crank 14. The spindle 15 is nondisplaceably mounted in an extension 13' of the slide and is guided in a threaded boss 1' of the machine frame. On the slide 13 there is also mounted a feeling lever 17 which can swing about a pivot 16 and is shown in FIGURE 1 as a double-armed lever. One end 17' of the lever carries a roller 18 which bears against the periphery of template 11. The other end 17" of the lever 17 bears directly against the machine tool 19, or its carrier 19', which is displaceable radially to the axis of the work shaft 8. For this purpose the tool carrier 19' is guided in the bore 20 of a slide 21 so as to be axially movable to a certain extent, and the slide 21 is mounted in a guide 22 of the machine frame and is radially movable to a corresponding extent relative to the axis of the work.

The slide 13 which carries the template 11 and the feeling lever 17 can, therefore, be adjusted at an acute angle relative to the adjusting movement of the tool carrier 19 or its slide 21. In other words, the plane passing through the pivot 16 of the feeling lever 17 parallel to the path of movement of the slide 13 intersects the plane which passes through the axis of the work shaft 8 and the cutting edge 19" of the tool. The arm 17" which acts directly on the tool carrier 19' includes, together with the longitudinal axis of the tool carrier, an angle of approximately 90°. The lever arms 17' and 17" are preferably of the same length, whereas the dimensions of the template 11 are preferably such that its diameter corresponds to the diameter of the largest work to be machined with the apparatus.

For machining work of different diameters and geometrically similar shape, the apparatus of the invention is so constructed that the pivot 16 of the lever 17, after corresponding adjustment of the slide 13, crosses the longitudinal axis 23 passing through the machine tool 19 when the cutting edge 19" of the tool coincides with the axis of the work shaft 8. When the apparatus is constructed in this manner, then, for altering the diameter of the work at any time, it is only necessary to adjust the slide 13 by the spindle 15, because then the machine tool 19 together with its slide 21 is correspondingly adjusted and, owing to the proportional alteration of the effective lever length $a$ of the feeling lever 17 which takes place at the same time, the profile of the work is maintained and, at the same time, the rings of different diameters which are then made are of geometrically similar shape.

As shown in FIGURE 2, the apparatus of the invention can be modified by using a feeling lever 24 having a single arm instead of the double-armed lever 17 of FIGURE 1. The lever 24 is also provided with a roller 18 which bears against the template 11 and is mounted on a pivot 16 in the slide 13 which carries the template and moves in the direction of arrow A. The adjusting movement of the slide relative to that of the machine tool 19 or its carrier 19′ takes place at an acute angle $\varphi$ which is related to the diameter $r$ of the work and the effective length $a$ of the lever 24, i.e. the distance between its fulcrum 16 and its point of contact B with the tool carrier, and is given by the relation $$\tan \varphi = \frac{a}{r}$$

as shown in FIGURES 2 and 3.

FIGURE 3 shows a preferred form of construction for the bearing of the tool 19, or the tool carrier 19′, in the slide 21. The tool carrier 19′ is held by leaf springs 25 in the slide 21. The leaf springs 25 are so formed that they only allow for the relatively small to-and-fro movement of the tool 19 which occurs during turning of non-circular profiles whereas the adjustment of the tool necessary for turning work of different diameter is effected by the slide 21. The latter is preferably acted upon by a spring which ensures that the tool carrier 19 always presses against the feeling lever 17 or 24. For this purpose it may be advantageous in some cases to mount the feeling lever in an adjustable eccentric bush in order to be able to vary the pressure of the tool carrier 19′ within limits.

I claim:

1. Apparatus for machining the periphery of a workpiece, comprising a base, first support means on said base engaging said workpiece for rotation thereof about a predetermined axis, tool means disposed on said base displaceable substantially linearly radially with respect to said axis and engageable with the periphery of said workpiece, second support means displaceable on said base relatively to said first support means, a template journaled for rotation on said second support means in step with the rotation of said workpiece, a follower lever fulcrumed to said second support means and bearing upon said template and said tool means for displacement of the latter in accordance with the contours of said template, guide means on said base for guiding said second support means in a direction inclined to the direction of displacement of said tool means, and adjusting means for displacing said second support means along said guide means relatively to said tool means to vary the distance between the fulcrum of said lever and the point of engagement of said tool means therewith.

2. Apparatus for machining the periphery of a workpiece, comprising a base, first support means on said base engaging said workpiece for rotation thereof about a predetermined axis, tool means disposed on said base displaceable substantially linearly radially with respect to said axis and engageable with the periphery of said workpiece, second support means displaceable on said base relatively to said first support means, a template journaled for rotation on said second support means in step with the rotation of said workpiece, a follower lever fulcrumed to said second support means and bearing upon said template and said tool means for displacement of the latter in accordance with the contours of said template, said means on said base for guiding said second support means in a direction inclined to the direction of displacement of said tool means, said tool means lying substantially in an axial plane of said workpiece, and adjusting means for displacing said second support means along said guide means transversely to said axis relatively to said tool means and at an acute angle to the direction of displacement thereof, and to said plane to vary the distance between the fulcrum of said lever and the point of engagement of said tool means therewith.

3. Apparatus for machining the periphery of a workpiece, comprising a base, first support means on said base engaging said workpiece for rotation thereof about a predetermined axis, tool-carrier means disposed on said base displaceable substantially linearly radially with respect to said axis, a tool mounted on said tool-carrier means displaceable thereon in a direction substantially parallel to the direction of displacement of said tool-carrier means and engageable with the periphery of said workpiece, second support means displaceable on said base relatively to said first support means, a template journaled for rotation on said second support means in step with the rotation of said workpiece, a follower lever fulcrumed to said second support means and bearing upon said template and said tool for displacement of the latter in accordance with the contours of said template, guide means on said base for guiding said second support means in a direction inclined to the direction of displacement of said tool means, and adjusting means for displacing said second support means relatively to said tool-carrier means and at an acute angle to the direction of displacement thereof and concurrently radially displacing said tool-carrier means, thereby varying the distance between the fulcrum of said lever and the point of engagement of said tool therewith.

4. Apparatus according to claim 3 wherein said acute angle is such that said distance is reduced substantially to zero upon the cutting edge of said tool being disposed at said axis.

5. Apparatus for machining the periphery of a workpiece, comprising a base, first support means on said base engaging said workpiece for rotation thereof about a predetermined axis, tool means disposed on said base displaceable substantially linearly radially with respect to said axis and engageable with the periphery of said workpiece, second support means displaceable on said base relatively to said first support means, a template journaled for rotation on said second support means in step with the rotation of said workpiece, a double-arm follower lever fulcrumed to said second support means, one of the arms of said lever bearing upon said template, the other arm of said lever extending at substantially a right angle to the direction of displacement of said tool and bearing thereon for displacement of the latter in accordance with the contours of said template, guide means on said base for guiding said second support means in a direction inclined to the direction of displacement of said tool means, and adjusting means for displacing said second support means transversely to said axis relatively to said tool means and at an acute angle to the direction of displacement thereof, to vary the distance between the fulcrum of said lever and the point of engagement of said tool means therewith.

6. Apparatus for machining the periphery of a workpiece, comprising a base, first support means on said base engaging said workpiece for rotation thereof about a predetermined axis, tool-carrier means disposed on said base displaceable substantially linearly radially with respect to said axis, a tool mounted on said tool-carrier means limitedly displaceable thereon in a direction substantially parallel to the direction of displacement of said tool-carrier means and engageable with the periphery of said workpiece, second support means displaceable on said base relatively to said first support means, a template journaled for rotation on said second support means in step with the rotation of said workpiece, a double-arm follower lever fulcrumed to said second support means, one of the arms of said lever bearing upon said template, the other arm of said lever extending at substantially a right angle to the direction of displacement of said tool and bearing thereon for displacement of the latter in accordance with the contours of said template, guide means on said base for guiding said second support means in a direction inclined to the direction of displacement of said carrier-tool means, and adjusting means for displacing said second support means along said guide means transversely to said axis relatively to said tool-carrier means and at an acute angle to the direction of displacement thereof and concurrently radially displacing said tool-carrier means, thereby varying the distance between the fulcrum of said lever and the point of engagement of said tool therewith.

7. Apparatus for machining the periphery of a workpiece, comprising a base, first support means on said base engaging said workpiece for rotation thereof about a predetermined axis, tool-carrier means disposed on said base displaceable substantially linearly radially with respect to said axis, a tool mounted on said tool-carrier means displaceable thereon in a direction substantially parallel to the direction of displacement of said tool-carrier means, and engageable with the periphery of said workpiece, drive means for displacing said first support means along said base substantially parallel to said axis past said tool, second support means displaceable on said base relative to said first support means, a template journaled for rotation on said second support means in step with the rotation of said workpiece, a follower lever fulcrumed to said second support means and bearing upon said template and said tool for displacement of the latter in accordance with the contours of said template, guide means on said base for guiding said second support means in a direction inclined to the direction of displacement of said carrier-tool means, and adjusting means for displacing said second support means along said guide means transversely to said axis relatively to said tool-carrier means and at an acute angle to the direction of displacement thereof and concurrently radially displacing said tool-carrier means, thereby varying the distance between the fulcrum of said lever and the point of engagement of said tool therewith.

References Cited in the file of this patent

UNITED STATES PATENTS

| | | |
|---|---|---|
| 1,732,631 | Bennet | Oct. 22, 1929 |
| 1,879,201 | Groene | Sept. 27, 1932 |
| 2,493,621 | Cuttat | Jan. 3, 1950 |
| 2,932,227 | Koch et al. | Apr. 12, 1960 |